(12) United States Patent
Ballantyne et al.

(10) Patent No.: US 8,480,993 B2
(45) Date of Patent: Jul. 9, 2013

(54) MULTI-ELEMENT DIAMOND REFERENCE STANDARD

(75) Inventors: David Ballantyne, Ottawa (CA); Claude Dalpe, Gatineau (CA)

(73) Assignee: Her Majesty the Queen in right of Canada as represented by the Solicitor General acting through the Commissoner of the Royal Canadian Mounted Police, Ottawa (CA)

( * ) Notice: Subject to any disclaimer, the term of this patent is extended or adjusted under 35 U.S.C. 154(b) by 739 days.

(21) Appl. No.: 12/654,274

(22) Filed: Dec. 16, 2009

(65) Prior Publication Data

US 2010/0148119 A1    Jun. 17, 2010

Related U.S. Application Data

(60) Provisional application No. 61/193,700, filed on Dec. 17, 2008.

(51) Int. Cl.
*C09K 3/00* (2006.01)
*C04B 35/565* (2006.01)
*C01B 31/06* (2006.01)

(52) U.S. Cl.
USPC .............. 423/446; 252/182.23; 501/90

(58) Field of Classification Search
USPC ............. 252/182.32; 423/446; 501/90
See application file for complete search history.

(56) References Cited

U.S. PATENT DOCUMENTS

| | | | | |
|---|---|---|---|---|
| 4,874,398 A * | 10/1989 | Ringwood | ............. | 51/293 |
| 4,948,388 A * | 8/1990 | Ringwood | ............. | 51/308 |
| 4,985,051 A * | 1/1991 | Ringwood | ............. | 51/309 |
| 5,010,043 A * | 4/1991 | Ringwood | ............. | 501/90 |
| 5,106,393 A * | 4/1992 | Ringwood | ............. | 51/308 |
| 6,447,852 B1 * | 9/2002 | Gordeev et al. | ............. | 427/577 |
| 6,454,027 B1 * | 9/2002 | Fang et al. | ............. | 175/374 |
| 6,846,341 B2 * | 1/2005 | Middlemiss | ............. | 51/307 |

* cited by examiner

*Primary Examiner* — Peter F Godenschwager
(74) *Attorney, Agent, or Firm* — George A. Seaby

(57) ABSTRACT

A diamond reference standard contains a diamond composite of 60-90% diamond crystals and 10-40% silicon carbide binding agent doped with a plurality of elements. The standard is prepared by doping a diamond composite containing a silicon carbide binder with a plurality of elements, the presence of which can readily be detected using a variety of instruments, e.g. a mass spectrometer.

8 Claims, No Drawings

MULTI-ELEMENT DIAMOND REFERENCE STANDARD

CROSS REFERENCE TO RELATED APPLICATION

This application claims priority on U.S. Provisional Application 61/193,700 filed Dec. 17, 2008.

BACKGROUND OF THE INVENTION

This invention relates to a hard diamond composite material containing known amounts of specific elements for use as a reference standard.

To the best of the 'inventors' knowledge, there is no currently existing solid diamond matrix which can be used as a standard for diamond research or carbon composite research, or by manufacturers for quality control. Existing standards are lacking in terms of physical or chemical properties such as specific target elements for research, a super hard diamond-like matrix and as a result do not perform well when analyzed by some analytical methodologies, and/or are non-homogeneous.

Accordingly, a need exists for a material which can be used as a multi element diamond standard. The need for such a material was one of the recommendations highlighted at the "Diamond Fingerprinting—Expert workshop on the feasibility of source identification of conflict diamonds using analytical techniques" in Geel (2007, Belgium). Such a standard could find use by synthetic diamond manufacturers, law enforcement agencies and researchers in various fields. The present invention provides such a material.

U.S. Pat. No. 5,106,393, issued to Alfred E. Ringwood on Apr. 21, 1992, (which is incorporated herein by reference) describes the preparation of a diamond compact comprised of 60-90% diamond crystals connected by a silicon carbide bond. The compact is produced by intimately mixing the diamond crystals with a silicon bonding agent, and subjecting the resulting mixture to high temperature and pressure to form silicon carbide bonds between the matrix and the diamond grit.

BRIEF SUMMARY OF THE INVENTION

In accordance with the present invention, a diamond composite of the type described in the Ringwood patent was doped with a variety of elements to produce a hard diamond composite material having specific properties, which allow the use of the material as a chemical reference standard (a) for source referencing of rough diamonds, (b) in quality assurance in industrial diamond materials, (c) as a chemical reference material for use in scientific or academic study or (d) as uniquely identifiable chemical signatures for product identification.

DETAILED DESCRIPTION OF THE INVENTION

The specific composite used as a starting material is the original commercialized DiaCom® Polycrystalline Diamond (PCD) material patented by Ringwood Technologies, Australia. The DiaCom® was preferred over other PCD materials because of its intrinsic silicon content which can be used for calibration purposes with other common reference materials, e.g. National Institute of Standards and Technology (NIST) glass. The diamond composite contains 60-90% by volume diamond crystals and 10-40% by volume SiC/$Si_3N_4$ melt binder, and preferably 70% by volume diamond crystals and 30% of the melt binder.

Doping was obtained by adding doping solutions containing a variety of elements and a variety of nominal target concentration ranges to the raw materials used to prepare the diamond composite. The suite of trace elements was added to the original DiaCom® components to yield a homogeneous doped PCD blank without too much effect on its resistivity, i.e. <0.2 ohm cm. The resistivity factor is desired to facilitate cutting of the hard PCD using electrical discharge machining (EDM) process into different shapes such as discs for microbeam instruments. The elements are listed in Table 1.

TABLE 1

| Solution | Element name | Symbol |
|---|---|---|
| 1 | Lithium | Li |
| 2 | Beryllium | Be |
| 3 | Boron | B |
| 4 | Fluorine | F |
| 5 | Sodium | Na |
| 6 | Magnesium | Mg |
| 7 | Aluminum | Al |
| 8 | Phosphorous | P |
| 9 | Sulfur | S |
| 10 | Chlorine | Cl |
| 11 | Potassium | K |
| 12 | Calcium | Ca |
| 13 | Scandium | Sc |
| 14 | Titanium | Ti |
| 15 | Vanadium | V |
| 16 | Chromium | Cr |
| 17 | Manganese | Mn |
| 18 | Iron | Fe |
| 19 | Cobalt | Co |
| 20 | Nickel | Ni |
| 21 | Copper | Cu |
| 22 | Zinc | Zn |
| 23 | Gallium | Ga |
| 24 | Germanium | Ge |
| 25 | Arsenic | As |
| 26 | Selenium | Se |
| 27 | Bromine | Br |
| 28 | Rubidium | Rb |
| 29 | Strontium | Sr |
| 30 | Yttrium | Y |
| 31 | Zirconium | Zr |
| 32 | Niobium | Nb |
| 33 | Molybdenum | Mo |
| 34 | Rhodium | Rh |
| 35 | Palladium | Pd |
| 36 | Silver | Ag |
| 37 | Cadnium | Cd |
| 38 | Indium | In |
| 39 | Tin | Sn |
| 40 | Antimony | Sb |
| 41 | Tellurium | Te |
| 42 | Iodine | I |
| 43 | Cesium | Cs |
| 44 | Barium | Ba |
| 45 | Hafnium | Hf |
| 46 | Tantalum | Ta |
| 47 | Tungsten | W |
| 48 | Rhenium | Re |
| 49 | Osmium | Os |
| 50 | Platinum | Pt |
| 51 | Thallium | Tl |
| 52 | Lead | Pb |
| 53 | Bismuth | Bi |
| 54 | Lanthanum | La |
| 55 | Cerium | Ce |
| 56 | Praseodymium | Pr |
| 57 | Neodymium | Nd |
| 58 | Samarium | Sm |
| 59 | Europium | Eu |
| 60 | Gadolinium | Gd |
| 61 | Terbium | Tb |
| 62 | Dysprosium | Dy |

TABLE 1-continued

| Solution | Element name | Symbol |
|---|---|---|
| 63 | Holmium | Ho |
| 64 | Erbium | Er |
| 65 | Thulium | Tm |
| 66 | Ytterbium | Yb |
| 67 | Lutetium | Lu |
| 68 | Thorium | Th |
| 69 | Uranium | U |

More specifically, a multi-element standard solution containing the elements listed in Table 1 was prepared in a weak acidic solution, preferably 2-3% by volume $HNO_3$ and added to a bi-modal nitrogen enriched synthetic diamond grit blend (25 μm/6 μm), and the blend was gently mixed by hand using a special mortar and pestle (made of DiaCom®). A small amount of nitrogen is necessary for reaching the required resistivity range for EDM cutting. Once the mixture was dried, it was further mixed using a DiaCom® ball-mill shaker.

The mixture was then placed in a piston cylinder apparatus (F. R. Boyd and J. L. England, J. Geophys. Res., 1960, 65, 741-748) to achieve the pressure and temperature conditions where the diamond encountered plastic deformation and a partial melting reaction with the surrounding $Si-Si_3N_4$ binder agents, i.e. 1600° C. at 3.3 GPa in the graphite stability field for approximately 25 min or less. The end product consists of a solid PCD blank containing ~70% by volume diamond and ~30% by volume doped $SiC/Si_3N_4$ quenched metal binder.

Under visual examination, the doped materials thus produced were clearly homogeneous. As a first step in detailed analysis, LA-ICP-MS (laser ablation inductively coupled mass spectrometry) spot analyses were acquired across different PCD discs or chips obtained from the different run products to evaluate their homogeneity. During this stage three laser systems were linked to the Element 2 XR ICP-MS for evaluating their efficiency to best analyze the PCD's (two 193 nm ArF laser systems: Geolas 200M by Coherent-LamdaPhysik-Microlas, GmbH/UP193FX from ESI-NWR, CA, USA and a 213 nm solid-state UP213 system from ESI-NWR). For all analyses $^{29}Si$ was used as the primary internal calibrating mass with NIST SRM-612 glass as the external standard reference material. Silicon was selected because it is one of the major components in the PCD with a concentration of 216,924 ppm, which is the average value obtained by using an electron probe micro-analyzer (EPMA) and instrument neutron activation analysis (INAA). Most of the data were acquired on the ICP-MS (inductively coupled mass spectrometer) at low resolution mode but some were acquired at medium resolution mode to evaluate potential carbide polyatomic interference(s) for some of the rare-earth elements. Out of six run products, one doped PCD run product was most thoroughly studied because of its homogeneity characteristics. Three 2 mm thick discs were cut near the bottom, center and top of the PCD blank (~13 mm Ø by 15 mm H) and characterized by EPMA, INAA and LA-ICP-MS.

The LA-ICP-MS results obtained with both UP systems showed better "homogeneity characteristic" than the Geolas system for the three discs. It is believed this resulted from a different sample cell design rather than wavelength (SuperCell™ for the UP systems compared to a single-input/output cylindrical design for the Geolas). The preliminary trace elements variability were grouped in three categories based on their relative standard deviation (RSD) across the discs from multiple analyses (i.e., $RSD_{Li, Be, Al, Rb, Sr, Y, Cs, Ce, Pr, Nd, Sm, Eu, Dy, Ho, Er, Yb, Lu} < 10\%$, $RSD_{C, La, Gd} < 5\%$ and $RSD_{Sc} < 20\%$; n=259). All the other elements were indicating a $RSD_{B, Na, P, K, Ti, V, Mn, Co, Ni, Cu, Zn, Ga, Zr, Nb, Mo, In, Sn, Sb, Ba, Hf, Ta, W, Pb, Bi, Th, U} > 20\%$. However, those results were greatly improved in terms of RSD and concentration closer to INAA values when the guard electrode on the ICP was not grounded (i.e., switched off) and the laser (UP193FX) was operated at 100 Hz, 150 μm spot, 2.9 $GW/cm^2$ (or ~14.8 $J/cm^2$; on both the PCD and the NIST glass). Under these conditions Al, Be, B, Na, P, K, Ca, Sc, Ti, V, Cu, Zn, Rb, Sr, Y, Zr, Nb, Mo, In, Cs, La—Lu, Hf, Ta, W, and U indicated RSD<10% with concentration within 1 to 2σ of INAA values. Fractionation effect observed for some elements [e.g., MREE (medium rare earth elements) to HREE (heavy rare earth elements)] between NIST and PCD were related to laser frequency and integration time zone rather than polyatomic interferences as confirmed by operating the ICP-MS at medium resolution mode (see fractionation index—S. E. Jackson, MAC Short Course Series, Vol. 40, 2008, 169-186).

The results demonstrate that DiaCom® PCD can be doped successfully with an acceptable degree of homogeneity. This is the first diamond based man-made ceramic compound doped with precise isotopes/isotopic ratio solutions to be manufactured as a reference material (RM) for applications applied to diamond analysis and other specific applications (e.g., quality control, isotope ratios, product identification).

The invention claimed is:

1. A diamond reference standard comprising a diamond composite containing diamond crystals connected by a silicon carbide bond doped with the elements:

Lithium, Beryllium, Boron, Fluorine, Sodium, Magnesium, Aluminum, Phosphorous, Sulphur, Chlorine, Potassium, Calcium, Scandium, Titanium, Vanadium, Chromium, Manganese, Iron, Cobalt, Nickel, Copper, Zinc, Gallium, Germanium, Arsenic, Selenium, Bromine, Rubidium, Strontium, Yttrium, Zirconium, Niobium, Molybdenum, Rhodium, Palladium, Silver, Cadmium, Indium, Tin, Antimony, Tellurium, Iodine, Cesium, Barium, Hafnium, Tantalum, Tungsten, Rhenium, Osmium, Platinum, Thallium, Lead, Bismuth, Lanthanum, Cerium, Praseodymium, Neodymium, Samarium, Europium, Gadolinium, Terbium, Dysprosium, Holmium Erbium, Thulium, Ytterbium, Lutetium, Thorium, and Uranium.

2. The diamond reference standard of claim 1, wherein the diamond composite contains 60-90 percent by volume diamond and 10-40 percent by volume doped $SiC/Si_3N_4$ melt binder.

3. The diamond reference standard of claim 1, wherein the diamond composite contains 70 percent by volume diamond and 30 percent by volume doped $SiC/Si_3N_4$ melt binder.

4. A method of producing the diamond reference standard of claim 1 comprising the step of doping a diamond composite containing diamond crystals connected by a silicon carbide bond with a plurality of elements.

5. The method of claim 4, wherein the diamond composite contains 60-90 percent by volume diamond crystals and 10 to 40 percent by volume $SiC/Si_3N_4$ binding agent.

6. The method of claim 5, wherein doping is effected by preparing a multi-element solution in a weak acid; mixing the acid solution with a nitrogen enriched synthetic diamond grit blend; drying the blend; and subjecting the blend to sufficient pressure and temperature that the diamond grit encounters plastic deformation and a partial melting reaction with surrounding silicon-silicon nitride binding agent.

7. The method of claim 6 wherein the weak acid is 2 to 3 percent by volume nitric acid.

8. The method of claim 4, wherein the diamond composite contains 70 percent by volume diamond crystals and 30 percent by volume $SiC/Si_3N_4$ binding agent.

* * * * *